(12) United States Patent
Rippel et al.

(10) Patent No.: US 10,060,682 B2
(45) Date of Patent: Aug. 28, 2018

(54) FLUID-COOLED WOUND STRIP STRUCTURE

(71) Applicant: PRIPPELL TECHNOLOGIES, LLC, Los Angeles, CA (US)

(72) Inventors: Wally E. Rippel, Altadena, CA (US); Eric Rippel, Los Angeles, CA (US)

(73) Assignee: Prippell Technologies, LLC, Los Angeles, CA (US)

( * ) Notice: Subject to any disclaimer, the term of this patent is extended or adjusted under 35 U.S.C. 154(b) by 155 days.

(21) Appl. No.: 14/807,697

(22) Filed: Jul. 23, 2015

(65) Prior Publication Data

US 2016/0025421 A1    Jan. 28, 2016

Related U.S. Application Data

(60) Provisional application No. 62/029,357, filed on Jul. 25, 2014.

(51) Int. Cl.
| | |
|---|---|
| *F28D 7/02* | (2006.01) |
| *F28F 1/02* | (2006.01) |
| *F28F 3/08* | (2006.01) |
| *F28D 1/047* | (2006.01) |
| *H02K 9/00* | (2006.01) |

(Continued)

(52) U.S. Cl.
CPC ............ *F28F 1/025* (2013.01); *F28D 1/0473* (2013.01); *F28D 7/02* (2013.01); *F28F 1/02* (2013.01); *F28F 3/086* (2013.01); *H01F 27/08* (2013.01); *H01F 27/245* (2013.01); *H01F 27/25* (2013.01); *H02K 5/20* (2013.01); *H02K 9/00* (2013.01);

(Continued)

(58) Field of Classification Search
CPC .... F28F 1/025; F28F 1/02; F28F 3/086; F28F 2250/04; F28D 1/0473; F28D 7/02; H01F 27/08; H01F 27/245; H01F 27/25; H01F 27/322; H02K 5/20; H02K 9/00; H02K 9/197

USPC ......................................................... 165/163
See application file for complete search history.

(56) References Cited

U.S. PATENT DOCUMENTS

| | | |
|---|---|---|
| 1,877,904 A | 9/1932 | Laffoon |
| 2,433,660 A | 12/1947 | Granfield |

(Continued)

FOREIGN PATENT DOCUMENTS

| | | |
|---|---|---|
| CN | 1599197 A | 3/2005 |
| CN | 102538562 A | 7/2012 |

(Continued)

OTHER PUBLICATIONS

International Search Report and Written Opinion for International Application No. PCT/US15/41824, dated Oct. 23, 2015, 10 pages.

(Continued)

*Primary Examiner* — Justin Jonaitis
(74) *Attorney, Agent, or Firm* — Lewis Roca Rothgerber Christie LLP

(57) ABSTRACT

A wound strip structure for efficient heat transfer. The structure includes one or more edge-wound or face-wound strips. At least one of the strips has a plurality of turns and a plurality of apertures, and an aperture of a turn of the strip overlapping an aperture of an adjacent turn, of the strip or of another strip, to form a portion of a fluid channel. The fluid channel may be used to conduct a cooling fluid to cool the structure.

29 Claims, 15 Drawing Sheets

(51) Int. Cl.
    *H02K 5/20*     (2006.01)
    *H02K 9/197*     (2006.01)
    *H01F 27/08*     (2006.01)
    *H01F 27/245*     (2006.01)
    *H01F 27/25*     (2006.01)
    *H01F 27/32*     (2006.01)

(52) U.S. Cl.
    CPC .......... *H02K 9/197* (2013.01); *F28F 2250/04* (2013.01); *H01F 27/322* (2013.01)

(56) References Cited

U.S. PATENT DOCUMENTS

| | | | |
|---|---|---|---|
| 2,471,317 A * | 5/1949 | Fausek | F28D 7/022 165/141 |
| 2,607,816 A | 8/1952 | Ryder et al. | |
| 2,711,008 A | 6/1955 | Smith | |
| 2,774,000 A | 12/1956 | Ross | |
| 2,792,511 A | 5/1957 | Horstman | |
| 2,981,856 A | 4/1961 | Ludemann et al. | |
| 3,165,655 A | 1/1965 | Eis | |
| 3,206,964 A * | 9/1965 | Hart | B21D 11/06 29/605 |
| 3,225,424 A * | 12/1965 | Wiley | H02K 1/16 29/605 |
| 3,257,572 A | 6/1966 | Ludemann et al. | |
| 3,288,209 A | 11/1966 | Wall et al. | |
| 3,447,002 A | 5/1969 | Rönnevig | |
| 3,498,370 A * | 3/1970 | Raggs | F28D 7/026 165/156 |
| 3,597,645 A | 8/1971 | Duffert | |
| 3,827,141 A | 8/1974 | Hallerback | |
| 3,896,320 A | 7/1975 | Moffatt | |
| 4,200,818 A | 4/1980 | Ruffing et al. | |
| 4,208,597 A | 6/1980 | Mulach et al. | |
| 4,392,073 A | 7/1983 | Rosenberry, Jr. | |
| 4,425,521 A | 1/1984 | Rosenberry, Jr. et al. | |
| 4,672,252 A | 6/1987 | Spirk | |
| 4,745,314 A | 5/1988 | Nakano | |
| 4,993,487 A | 2/1991 | Niggemann | |
| 5,325,684 A | 7/1994 | Stierlin et al. | |
| 5,365,211 A | 11/1994 | Carbaugh, Jr. et al. | |
| 5,760,516 A | 6/1998 | Baumann et al. | |
| 5,859,482 A * | 1/1999 | Crowell | H02K 5/20 310/54 |
| 5,889,342 A | 3/1999 | Hasebe et al. | |
| 6,121,708 A | 9/2000 | Müller | |
| 6,239,530 B1 | 5/2001 | Garcia | |
| 6,265,801 B1 | 7/2001 | Hashiba et al. | |
| 6,304,018 B1 | 10/2001 | Ham et al. | |
| 6,535,099 B1 | 3/2003 | Cruz | |
| 6,611,076 B2 | 8/2003 | Lindbery et al. | |
| 6,710,479 B2 | 3/2004 | Yoshida et al. | |
| 6,724,119 B1 | 4/2004 | Wellisch | |
| 6,787,948 B2 | 9/2004 | Peterson et al. | |
| 6,903,471 B2 | 6/2005 | Arimitsu et al. | |
| 6,954,010 B2 * | 10/2005 | Rippel | H02K 1/20 310/216.014 |
| 7,057,324 B2 | 6/2006 | Breznak et al. | |
| 7,122,923 B2 | 10/2006 | Lafontaine et al. | |
| 7,661,460 B1 * | 2/2010 | Cowans | F28D 7/024 165/140 |
| 7,851,966 B2 | 12/2010 | Rippel | |
| 8,405,262 B1 | 3/2013 | Beatty et al. | |
| 2005/0115699 A1 | 6/2005 | Nuris et al. | |
| 2007/0013241 A1 | 1/2007 | Schiferl et al. | |
| 2009/0113696 A1 | 5/2009 | Holmes | |
| 2009/0195092 A1 | 8/2009 | Gagnon | |
| 2009/0195108 A1 | 8/2009 | Rippel | |
| 2011/0094720 A1 * | 4/2011 | Wang | F28D 7/1607 165/161 |
| 2011/0254391 A1 | 10/2011 | Elender et al. | |
| 2012/0080964 A1 | 4/2012 | Bradfield | |
| 2012/0080983 A1 | 4/2012 | Iund | |
| 2012/0086291 A1 | 4/2012 | DeBlock et al. | |
| 2012/0267971 A1 | 10/2012 | Husum et al. | |
| 2013/0049496 A1 | 2/2013 | Chamberlin et al. | |
| 2013/0069455 A1 | 3/2013 | Hamer et al. | |
| 2013/0113311 A1 | 5/2013 | Downing et al. | |
| 2013/0119816 A1 | 5/2013 | Yang et al. | |
| 2014/0042841 A1 | 2/2014 | Rippel et al. | |
| 2015/0280525 A1 | 10/2015 | Rippel et al. | |
| 2016/0087509 A1 | 3/2016 | Rippel et al. | |
| 2016/0265808 A1 * | 9/2016 | Magnone | F24H 1/43 |

FOREIGN PATENT DOCUMENTS

| | | |
|---|---|---|
| CN | 102538562 B | 8/2013 |
| DE | 39 43 626 C2 | 3/1994 |
| GB | 2484386 A | 4/2012 |
| JP | 06-224024 A | 8/1994 |
| JP | H10271716 A | 10/1998 |
| JP | 2000-232740 A | 8/2000 |
| JP | 2002-93624 A | 3/2002 |
| JP | 2003-134701 A | 5/2003 |
| JP | 2004-215495 A | 7/2004 |
| JP | 2004-236495 A | 8/2004 |
| JP | 2005-333697 A | 12/2005 |
| JP | 2007-209070 A | 8/2007 |
| WO | WO 01/05015 A2 | 1/2001 |
| WO | WO 03/094323 A1 | 11/2003 |

OTHER PUBLICATIONS

U.S. Appl. No. 15/010,879, Not yet published, Rippel et al.
International Search Report and Written Opinion for related International Patent Application No. PCT/US2015/050649; dated Dec. 10, 2015 (11 pages).
International Search Report and Written Opinion for related International Patent Application No. PCT/US2015/021453; dated Aug. 14, 2015 (19 pages).
International Search Report and Written Opinion for related International Patent Application No. PCT/US2016/015700, dated Apr. 1, 2016 (9 pages).
Invitation to Pay Additional Fees and, where Application, Protest Fee for PCT Application No. PCT/US2015/021453, dated Jun. 15, 2015, 9 pages.
Japanese Notice of Reasons for Rejection, with English translation, for Patent Application No. 2017-525315, dated Feb. 6, 2018, 14 pages.
Chinese Notification of the First Office Action, for Patent Application No. 201580041169.4, dated Apr. 3, 2018, 12 pages.
Partial English translation of the Chinese Notification of the First Office Action, for Patent Application No. 201580041169.4, dated Apr. 3, 2018, 8 pages.
Examination Report issued in German Application No. 11 2015 003 443.9, dated May 4, 2018, 7 pages.
English Translation of Examination Report issued in German Application No. 11 2015 003 443.9, dated Apr. 30, 2018, 6 pages.

* cited by examiner

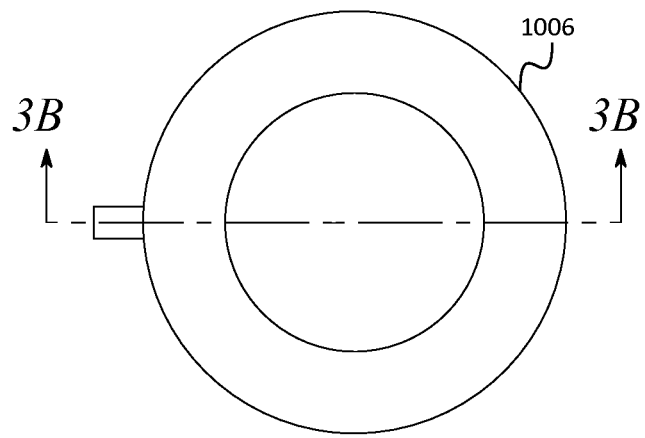
*FIG. 3A*
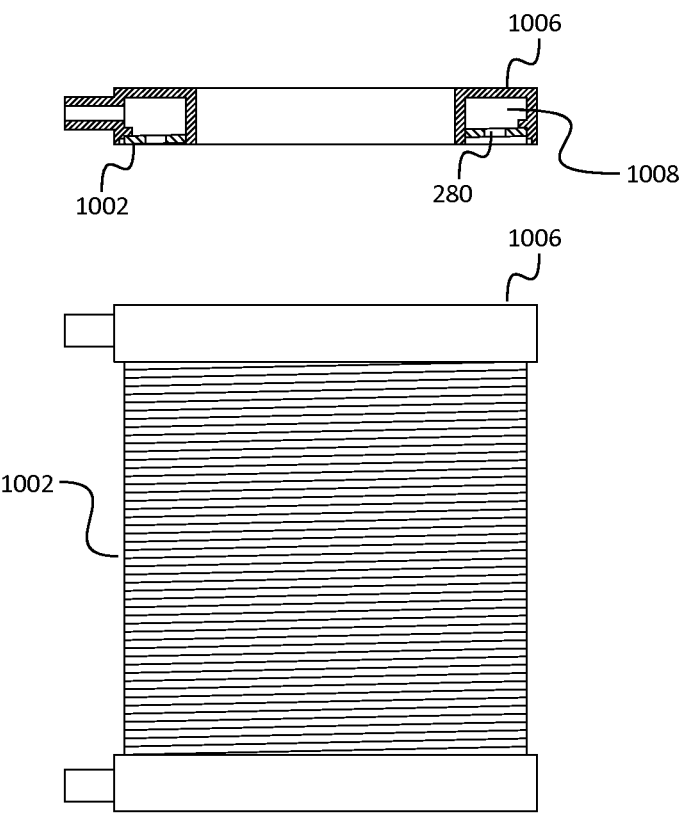
*FIG. 3B*
*FIG. 3C*

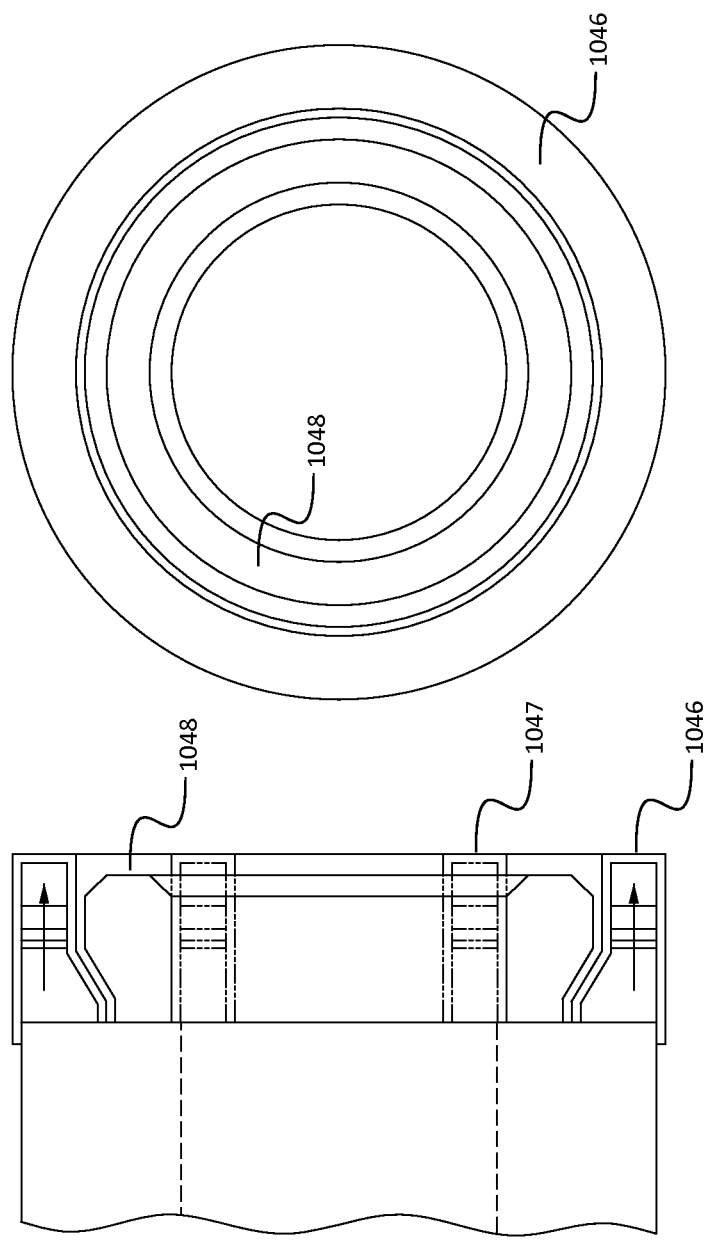

FLUID-COOLED WOUND STRIP STRUCTURE

CROSS-REFERENCE TO RELATED APPLICATION(S)

The present application claims priority to and the benefit of U.S. Provisional Application No. 62/029,357, filed Jul. 25, 2014, entitled "FLUID-COOLED WOUND STRIP STRUCTURE", the entire content of which is incorporated herein by reference.

FIELD

One or more aspects of embodiments according to the present invention relate to heat exchange structures, and more particularly to a wound strip structure for providing efficient heat transfer.

BACKGROUND

Energy conversion devices, such as electric motors and transformers may be less than 100% efficient, and the efficiency shortfall may appear in the form of heat or thermal energy. This heat energy may be transferred to the environment (e.g., air) with adequate efficiency such that components within the device do not become excessively hot. The average rate of heat production (thermal power) for conversion devices may be approximately proportionate to the average through-power of the device. Accordingly, for such devices, the continuous power rating may be determined by the efficiency of heat transfer between heat dissipating components within the device and the ambient environment. As heat transfer is improved, the continuous rating may be increased, and the utility of the device thereby enhanced. Thus, there is a need for a structure which has general utility in connection with heat transfer applications, and which specifically applies to electric machines, transformers, and other magnetic components.

SUMMARY

According to an embodiment of the present invention there is provided a wound strip structure including one or more edge-wound or face-wound strips including a first strip, the one or more strips having a plurality of apertures, the first strip having a plurality of turns, an aperture of a turn of the first strip overlapping an aperture of an adjacent turn, to form a portion of a fluid channel.

In one embodiment, the first strip has: a first aperture, a second aperture, and a third aperture, having the same size and shape, and uniformly spaced along the first strip.

In one embodiment, the first strip has a first aperture and a second aperture, the first aperture differing in shape and/or in size from the second aperture.

In one embodiment, the one or more strips include a second strip co-wound with the first strip, the second strip having a plurality of turns, wherein an aperture of a turn of the second strip overlaps an aperture of an adjacent turn of the first strip to define a portion of a fluid channel.

In one embodiment, the first strip has an aperture differing in shape and/or in size from an aperture of the second strip.

In one embodiment, at least one of the one or more strips: is edge-wound; and has a plurality of notches configured to facilitate winding.

In one embodiment, the structure includes a manifold having a manifold channel in fluid communication with the plurality of fluid channels.

In one embodiment, the structure includes a flow director configured to direct fluid flow into, or receive fluid flow from, a subset of the plurality of fluid channels.

In one embodiment, the flow director is a turn of the first strip, wherein a turn adjacent to the first turn includes an aperture not aligned with an aperture of the first turn.

In one embodiment, the structure includes a manifold having a manifold channel in fluid communication with the plurality of fluid channels, wherein the flow director is secured to or integral with the manifold.

In one embodiment, the structure includes a cylindrical sealing sleeve configured to seal an inner surface or an outer surface of the structure.

In one embodiment, at least one of the one or more edge-wound or face-wound strips is composed of a non-isotropic material.

In one embodiment, the structure includes a second strip co-wound with the first strip, wherein the first strip is composed of a non-isotropic material.

In one embodiment, the first strip is composed of a ferromagnetic material.

In one embodiment, the first strip is composed of a dielectric material.

In one embodiment, a first turn of the structure has a first inside diameter and a first outside diameter; and a second turn of the structure has a second inside diameter and a second outside diameter; and wherein: the second inside diameter is different from the first inside diameter and/or the second outside diameter is different from the first outside diameter.

In one embodiment, the one or more strips include a third strip concentric with the first strip and the second strip, the first strip, the second strip, and the third strip being coupled by thermal coupling, mechanical coupling, magnetic coupling, electrical coupling, or combinations thereof.

In one embodiment, the one or more strips include a second strip concentric with the first strip, the first strip and the second strip being coupled by thermal coupling, mechanical coupling, magnetic coupling, electrical coupling, or combinations thereof.

In one embodiment, the first strip is composed of a non-isotropic material having a circumferential defining property vector; and the second strip is composed of a non-isotropic material having a radial defining property vector.

In one embodiment, the one or more strips include a second strip adjacent, and coaxial with, the first strip, the first strip and the second strip being coupled by thermal coupling, mechanical coupling, magnetic coupling, electrical coupling, or combinations thereof.

In one embodiment, the structure includes a sealant configured to prevent fluid from escaping from a fluid channel through a fissure between adjacent turns.

In one embodiment, the structure is configured to form part of an electric machine stator or rotor core.

In one embodiment, the structure is configured to form part of an inductor core.

In one embodiment, the structure is configured to form part of a transformer core.

In one embodiment, the structure is configured to form part of a heat transfer sleeve and having an interior surface configured as a thermal interface.

In one embodiment, the structure includes a plate, wherein: the heat transfer sleeve has the shape of a hollow cylinder, and the plate is secured to one end of the hollow cylinder to form a vessel.

In one embodiment, the structure is configured to form part of a heat transfer sleeve and having an exterior surface configured as a thermal interface and/or having an end surface configured as a thermal interface.

In one embodiment, the structure includes an electric machine stator, wherein the exterior surface or the interior surface of the heat transfer sleeve is thermally coupled to an end turn of the stator.

According to an embodiment of the present invention there is provided a wound strip structure including a strip having a plurality of apertures, the strip being edge-wound or face-wound and having a plurality of turns including two end turns and a plurality of interior turns, wherein: each of a first plurality of interior turns includes a plurality of first apertures each having a first length in the direction of the strip; each of a second plurality of interior turns, alternating with the turns of the first plurality of interior turns, includes a plurality of second apertures, each having a second length, shorter than the first length, in the direction of the strip; each of the plurality of second apertures overlaps two first apertures, adjacent to each other, of an adjacent turn; and each of the end turns is configured to direct fluid flow into, or receive fluid flow from, a subset of the apertures of an adjacent interior turn.

According to an embodiment of the present invention there is provided a wound strip structure having the shape of a hollow cylinder having an interior surface, an exterior surface, a first end surface and a second end surface, and including: one or more strips including a first strip having: two face surfaces; a first edge surface; and a second edge surface, the first strip being wound with a plurality of turns: in a helix, the first edge surface forming the interior surface of the cylinder, and the second edge surface forming the exterior surface of the cylinder, or in a spiral, the first edge surface forming the first end surface of the cylinder, and the second edge surface forming the second end surface of the cylinder, each turn of the first strip having a plurality of apertures, each aperture overlapping two apertures of an adjacent turn.

BRIEF DESCRIPTION OF THE DRAWINGS

These and other features and advantages of the present invention will be appreciated and understood with reference to the specification, claims and appended drawings wherein:

FIG. 3A is a top view of a wound strip structure including a wound strip and two manifolds, according to an embodiment of the present invention;

FIG. 3B is a cross section of a manifold taken through section line 3B-3B of FIG. 3A, according to an embodiment of the present invention;

FIG. 3C is a side view of the wound strip structure of FIG. 3A, according to an embodiment of the present invention;

FIG. 13A is a schematic side cutaway view of a stator with an external wound strip structure for cooling, according to an embodiment of the present invention;

FIG. 13B is an end view of the stator with an external wound strip structure for cooling of FIG. 13A.

DETAILED DESCRIPTION

The detailed description set forth below in connection with the appended drawings is intended as a description of exemplary embodiments of a fluid-cooled wound strip structure provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

For heat transfer structures in general, the goal is to achieve the lowest possible thermal impedance between an element which requires cooling and a medium such as a liquid coolant. Since thermal impedance tends to vary reciprocally with the prismatic volume of the structure, it follows that the product of thermal impedance and prismatic volume serves as a natural figure of merit (the lower, the better). In an embodiment, using multiple metal strips separated by 0.22 mm gaps with transformer oil forced to flow through these gaps, a thermal impedance-volume product of approximately 2.5 C/W-cm$^3$ is achieved with an associated head loss of 35 kPa per centimeter of flow length. Accordingly, by maintaining short coolant flow lengths and small gap dimensions, very high performance cooling can be achieved. This concept may be applied to magnetic components which are composed of either stacked laminations or wound strips. In these applications, both heat transfer and electromagnetic functions may simultaneously be provided by the magnetic material itself. In typical magnetic applications, magnetic materials are used having thickness dimensions in the range of 0.2 mm to 0.3 mm—which essentially matches the gap dimension identified above. This, in turn, motivates the structures which are presented and discussed herein.

Figure 1:
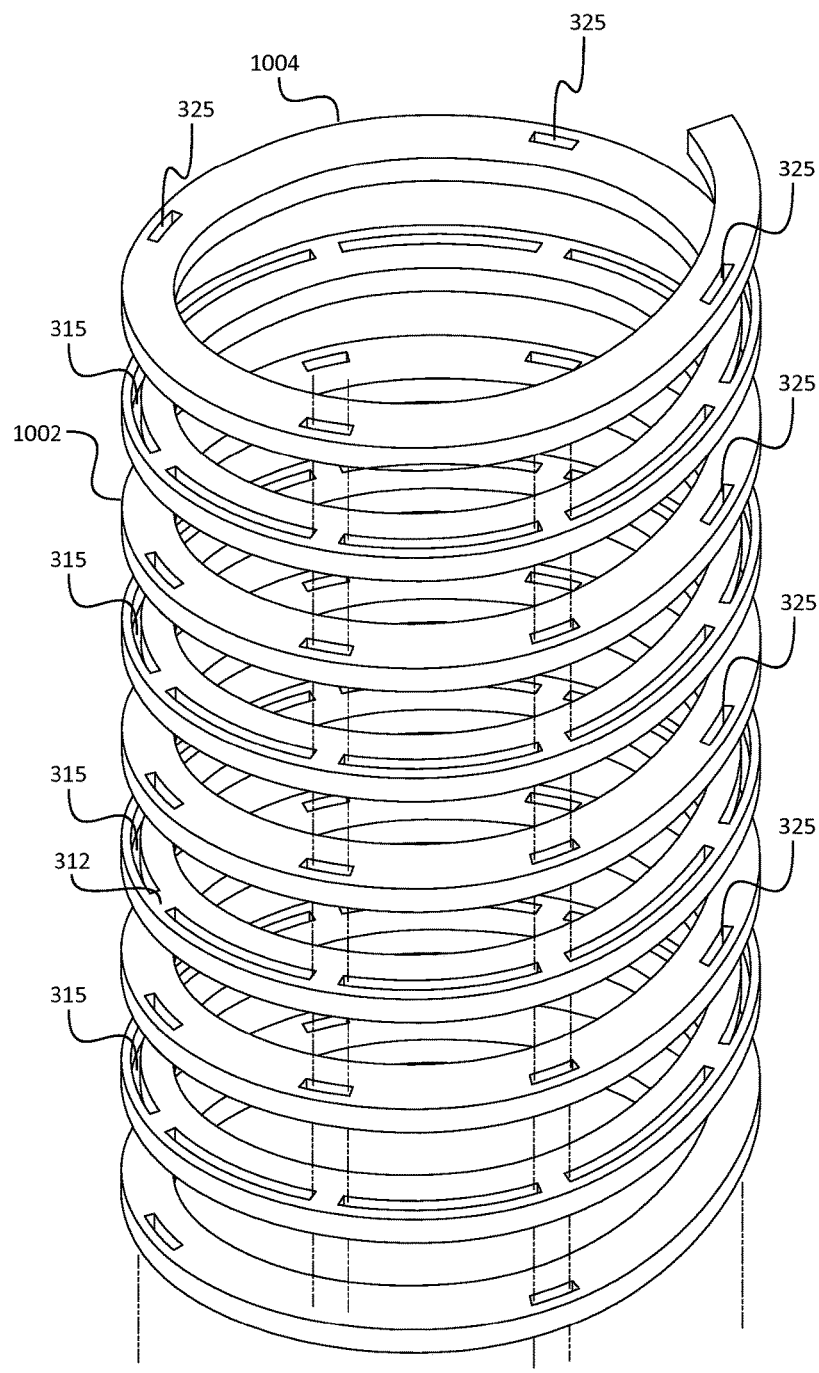
FIG. 1 is an exploded perspective view of a wound strip, according to an embodiment of the present invention.

Embodiments of the present invention provide fluid-cooled, wound strip structures which are easily fabricated and which provide good heat transfer. Referring to FIG. 1, in one embodiment, a single strip 1002 having a plurality of punched apertures 315, 325 is edge-wound, i.e., it has the shape of a piston ring or of a SLINKY™, being a strip with a length, a width, and a thickness, the length being greater than the width, and the width being greater than the thickness, the strip being wound into a helical shape, with the curvature of the strip at every point being parallel to the width direction. The plurality of apertures 315, 325 includes a first plurality of relatively wide fluid apertures 315 and a second plurality of relatively narrow fluid apertures 325. The dimensions and placement of these apertures on the strip are selected such that when wound, they align to form a network of intersecting axial and transverse (e.g., azimuthal) coolant passages. In the case shown, each turn of the strip includes six apertures. Wide and narrow apertures are respectively present on alternating turns such that wide apertures from one turn face narrow apertures from adjacent turns.

Figure 2:
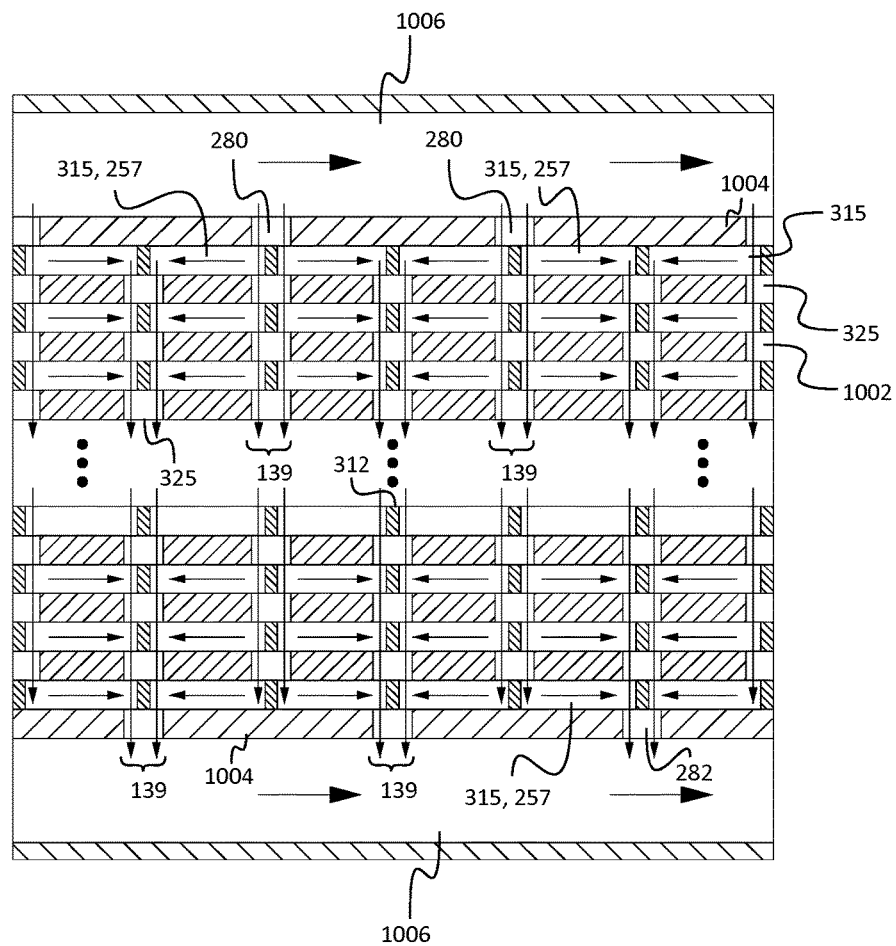
FIG. 2 is a schematic cross section of a cooling structure including a wound strip, according to an embodiment of the present invention.

FIG. 2 is a schematic cross section of a structure, or "wound strip structure", for heat transfer that includes a wound strip similar to the wound strip 1002 of FIG. 1. The azimuthal direction is horizontal in FIG. 2, and the axial direction is vertical. For simplicity, the slope of the strip that results from its helical shape is not shown in FIG. 2. The narrow fluid apertures 325 align to form axial passages 139 which connect to the opposing faces of the completed wound strip. In addition, the wide fluid apertures 315 form transverse passages 257 which connect adjacent axial passages 139. For example, if the strip has 2 n turns and each turn has m apertures, a total of nm such axial passages 139 are formed. Fluid may flow into the network of passages 139, 257 through a structure referred to herein as a flow director 1004 having a number of inlet ports 280, and the fluid may flow out of the network of passages 139, 257 through another flow director 1004 having a number of outlet ports 282. Each flow director may be a turn of the wound strip (as is the case in the embodiment of FIG. 1), or it may be a separate structure. Fluid may be supplied to the inlet ports 280 and received from the outlet ports 282 by respective manifolds 1006. Each of the inlet ports 280 and each of the outlet ports 282 may be aligned with one of the axial passages 139, there being fewer inlet ports 280 and fewer outlet ports 282 than the number of axial passages 139. If a given inlet port 280 is aligned with a particular axial passage 139, and no outlet port is aligned with that particular axial passage 139, then any fluid flowing in through the inlet port 280 will flow through one or more transverse passages 257 to one or more other axial passages 139 that are connected to respective outlet ports 282, and exit the structure through those outlet ports 282. The transverse passages may have a small axial dimension (e.g., an axial dimension about equal to the thickness of the strip, which may be about 0.2 mm), and as a result the corresponding flow of fluid through the transverse passages 257 may result in effective heat transfer between the fluid and the strip. The axial passages 139 need not be strictly axial as illustrated but may for example be helical.

As used herein, a "flow director" is a structure that allows fluid to flow into, or out of, some, but not all, of the axial passages in an edge-wound strip or the radial passages in a face-wound strip. If a flow director is used to implement flow restrictions, such as those in the example above, that prevent fluid from flowing through an axial passage 139 directly from an inlet to an outlet of the wound strip, then all fluid flowing from inlet to outlet may be forced to traverse at least one transverse passage 257, resulting in the heat transfer benefits associated with such transverse flow. An example of such a configuration is illustrated in FIG. 2, in which each inlet port 280 is aligned with an axial passage 139 that is not aligned with any outlet port 282. Several approaches may be used to provide such flow restrictions. In one approach, as described above, the first and last turns of the wound strip may act as flow directors, e.g., odd numbered apertures may be deleted for the first turn and even numbered apertures may be deleted for the last turn. In a second approach, an external element, such as an annulus having selected apertures is added at each of the faces of the wound strip. In a third approach, each manifold includes specific channels which communicate with the appropriate apertures at each face.

The inlet ports 280 and outlet ports 282 may be narrow fluid apertures 325 of end turns of the wound strip 1002 (which, in that case, form the respective flow directors), or they may be apertures of another structure abutting the end faces of the wound strip. In one embodiment a flow director is formed by combining a wound strip having a full complement of narrow fluid apertures 325 in an end turn with a structure having protrusions blocking half of the narrow fluid apertures 325.

An axial passage 139 (which is vertical in the orientation illustrated in FIG. 2) may be partially obstructed at every other turn by a post or "web" 312 separating a pair of adjacent wide fluid apertures 315. In one embodiment these partial obstructions are sufficiently small to avoid a significant increase in head loss for a given fluid flow rate through the structure.

In an embodiment with a single strip 1002, such as the one of FIG. 1, the transition between wide fluid apertures 315 and narrow fluid apertures 325 may be where the last wide fluid aperture and the first narrow fluid aperture merge to form a single aperture, the width of which is approximately equal to that of a wide aperture 315 plus half the width of a narrow aperture 325. The reverse may occur after 360 degrees of rotation, i.e., at a transition that is one full turn farther along the wound strip.

The use of alternating wide and narrow apertures as illustrated in FIGS. 1 and 2 (as opposed to the use of identical apertures) may result in the transverse passages 257 presenting larger heat transfer surfaces while at the same time avoiding the removal of more material than necessary from the strip 1002 to form the passages 139, 257; the presence of this material may be beneficial in the case of magnetic components. For some applications, e.g., applications that do not involve magnetics, useful designs may be achieved in which all apertures are identical and separations are all equal, with the aperture widths being greater than half of their center to center spacing.

In the case of magnetic components, the addition of apertures may reduce active magnetic cross sections. Compensation for this effect may be provided by increasing overall dimensions of the structure. Furthermore, in embodiments in which narrow and wide apertures alternate, the narrow apertures can be maintained relatively small, such that they have a relatively small impact on magnetic sections, while being sufficiently large to allow adequate axial coolant flow rates without adding excessive head loss. In another embodiment, magnetic section is largely preserved by forming a structure in which pairs of consecutive turns (or sets of more than two consecutive turns) with narrow fluid apertures 325 alternate with single turns with wide fluid apertures 315. This approach may increase magnetic section at the expense of heat transfer.

Referring to FIGS. 3A-C, each of the manifolds 1006 used with an edge-wound strip may have an annular fluid channel 1008 and may be secured to respective opposing faces of the wound strip 1002 such that coolant flow is directed into the inlet ports 280 at the first face and received from the outlet ports 282 at the second face. The ends of the wound strip 1002 may extend partially into the annular channels and abut against internal ridges in the annular channels. In other embodiments each annular channel may be narrower than the strip 1002 and the wound strip, instead of extending into the manifold, may abut against the manifold. In FIGS. 3A-3C, hidden lines are not shown, and only one turn of the wound strip 1002 is shown in FIG. 3B.

Figure 4:
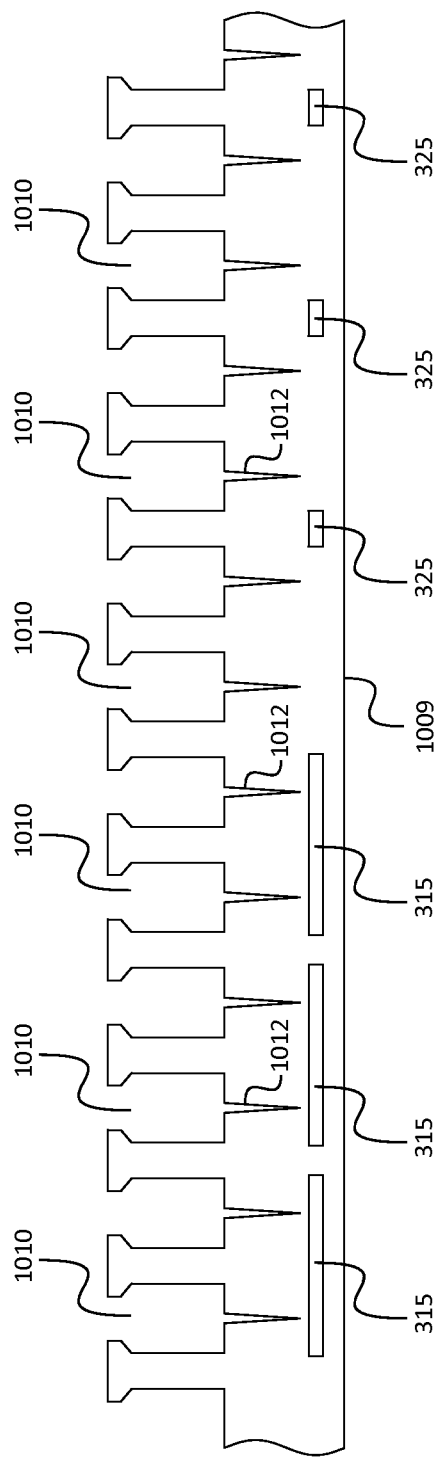
FIG. 4 is a plan view of a strip for forming a wound strip for a motor, according to an embodiment of the present invention.

FIG. 4 shows a punched strip 1009 prior to winding. Such a strip may be edge-wound and used as a stator core for a radial-gap electric machine. In one embodiment, slots 1010 are punched along the strip such that conventional stator core teeth are formed when the strip is edge-wound with the teeth pointing inward; the cooling apertures may be located in the "back iron", e.g., the portion of the strip that holds the teeth and that forms a magnetic flux return path for lines of flux passing through the teeth. Using this approach, a conventional, or "right-side out" radial-gap machine stator, in which the rotor is concentric with and inside the stator, may be formed from a strip, such as the one of FIG. 4, edge-wound to form a wound strip. A stator for an "inside-out" radial-gap machine, in which the stator is inside the rotor, may also be formed; conventional windings may be used in either case. For low pole-count machines, in which the back iron may be relatively thick, cuts 1012 may be added to inside diameter (I.D.) portions of the back iron to facilitate edge-bending, as shown in FIG. 4. If the back iron is relatively thin, as it may be in high pole count machines, the cuts 1012 may not be necessary.

The turns of a wound strip may be bonded to one another to form a rigid and rugged core structure, using techniques and bonding materials similar to those that may be used to bond the laminations of laminated magnetic structures. The resulting bonds between adjacent turns of the strip (and between manifolds and the faces of the strip structure) may provide an adequate seal to prevent coolant leakage. Various methods may also be used to provide additional sealing. These include the application of resins to the exterior surfaces of the completed structure and to the interior walls which form the axial passages 139 and transverse passages 257. Pressure techniques may be used to seal both the exterior surfaces and the interior walls. In one embodiment the sealant is applied by flooding the axial passages 139 and transverse passages 257, with the sealant under adequate hydrostatic pressure to inject the sealant into any voids between the turns that could allow coolant to leak from the passages and/or out of the wound strip. The flooded sealant is then substantially drained (i.e., drained except for the portion of the sealant that entered voids and/or stuck to the passage walls as a coating), and the removal of the excess (i.e., removable) sealant is aided by passing air through the passageways. Air pressure may be used to force the sealant into the voids, either in addition to or as an alternative to using hydrostatic pressure. Finally, the sealant is cured by subjecting it to an appropriate temperature cycle. In one embodiment the exterior surfaces are sealed using a powder-coating method.

Figure 5:
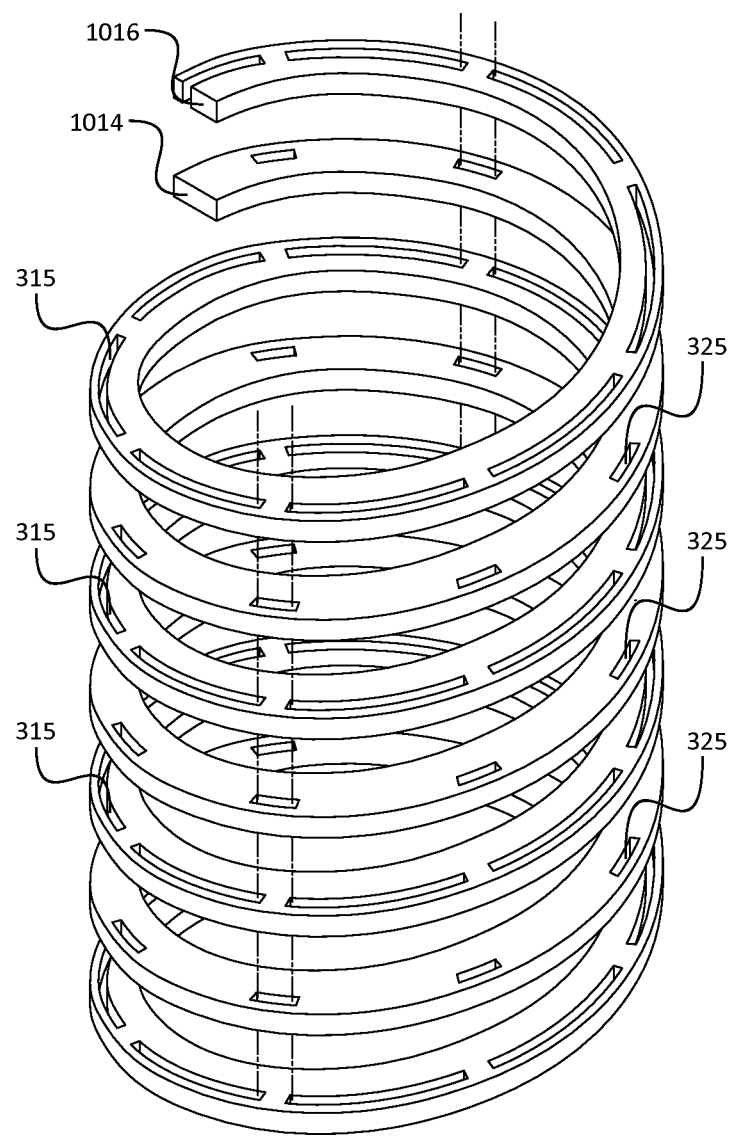
FIG. 5 is an exploded perspective view of two co-wound strips, according to an embodiment of the present invention.

Referring to FIG. 5, a wound strip structure may have alternating narrow fluid apertures 325 and wide fluid apertures 315 in respective alternating turns of two respective co-wound strips, in which a first strip 1014 has substantially identical narrow fluid apertures 325 evenly spaced and a second strip 1016 has substantially identical wide fluid apertures 315 of the same spacing. In this manner a structure with alternating narrow and wide apertures may be fabricated from two strips each of which has apertures of only a single respective size, which may simplify production.

Figure 6:
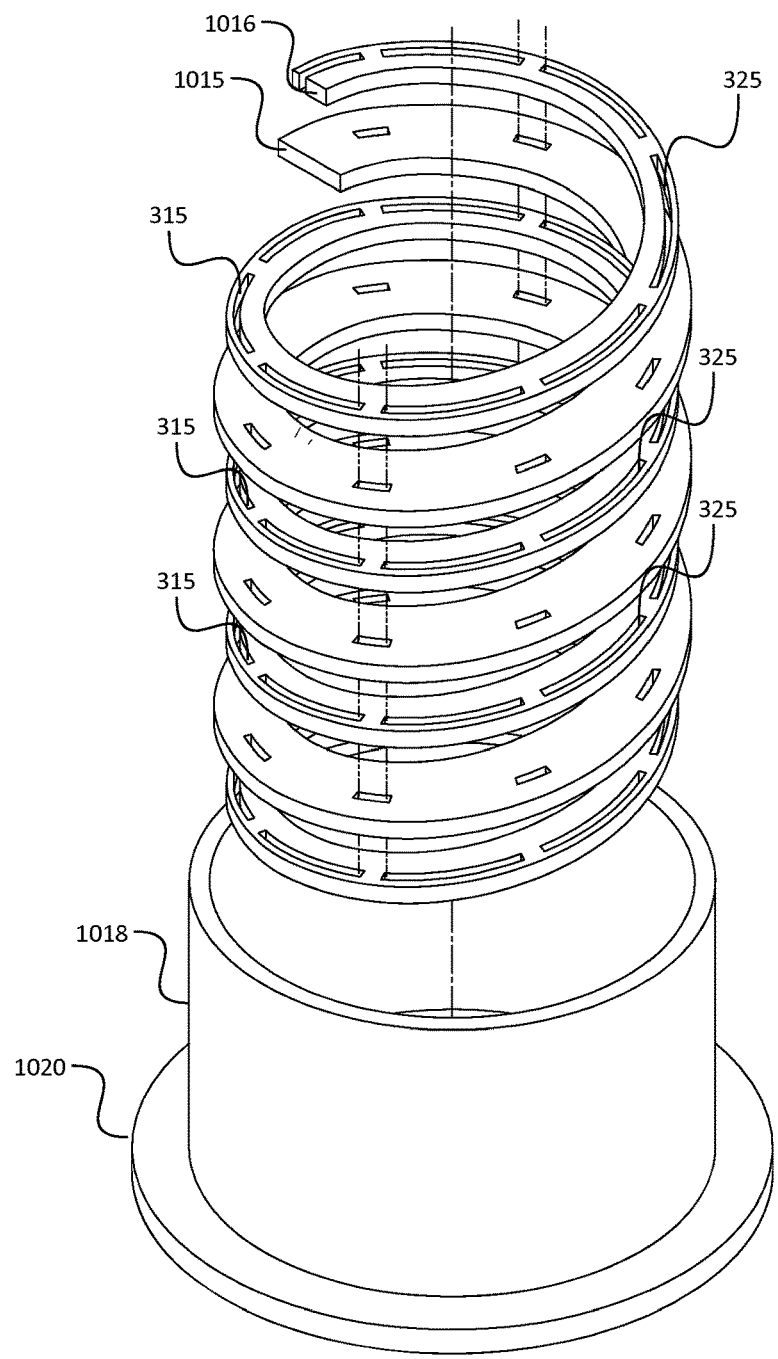
FIG. 6 is an exploded perspective view of two co-wound strips with a sealing sleeve and a plate, according to an embodiment of the present invention.

Referring to FIG. 6, in some embodiments, a wider strip 1015 and a narrower strip 1016 in a co-wound structure may form windings of varying diameters as illustrated. In the embodiment of FIG. 6, the wider strip 1015 has both a smaller inside diameter and a larger outside diameter than the narrower strip 1016. In some embodiments the two inside diameter are the same and the outside diameters differ, or vice versa. In some embodiments the wound strips may be in a sealing sleeve 1018 that may be concentric with and outside the wound strip or strips and may seal the exterior surface, and in some embodiments a plate 1020 may seal an end surface of the structure. A wound strip structure may have a sealing sleeve concentric with and inside the wound strip or strips, or a wound strip structure may have two sealing sleeves, an internal concentric sealing sleeve and an external concentric sealing sleeve. A sealing sleeve 1018 or a plate 1020 may also act as a thermal interface, e.g., to a component to be cooled.

In one embodiment, two or more simple strip structures are integrated. For example, referring to FIG. 7A, two edge-wound strips may be arranged concentrically as shown. A structure of this kind may be used in a radial-gap electric machine stator in which the rotor is inside the stator. In this case the inner wound strip 1022 (which may be formed with inward-facing teeth, not shown in FIG. 7A) may provide the function of the "tooth iron", while the outer wound strip 1002 may serve as the back iron. In assembly, the inner strip 1022 is first wound, after which the outer core is applied as an interference fit with the inner core. Such a part may be assembled using a thermal shrink process. For example, the outer wound strip 1002 may be heated so that its inside diameter expands enough to be larger than the outside diameter of the inner wound strip, and the outer wound strip may then be slid onto the inner wound strip. If the two concentric wound strips are assembled before the turns of one or the other are bonded together, then the compliance of the unbonded wound strip or wound strips when subjected to radial expansion or compression forces may be sufficiently great that it may be possible to press the two parts together (e.g., without heating the outer wound strip 1002) without damaging either strip. The teeth of the tooth iron may open inward or outward. In the case of outward-opening teeth, the outer (back-iron) strip may abut against the ends of the teeth and form a portion of the magnetic circuit between adjacent teeth. In this case the slots between the teeth of the tooth iron, prior to assembly with the back iron, may be outwardly-facing, fully open slots, and winding of the stator coil may be simpler than with conventional cores where slots face inward and where slot gaps are relatively narrow. For this reason, higher packing factors may be achievable with such a design. In such a design, closed slots may face the rotor; consequently, magnetic tooth tip losses may be reduced, although the peak torque may be reduced also.

Figure 7A:
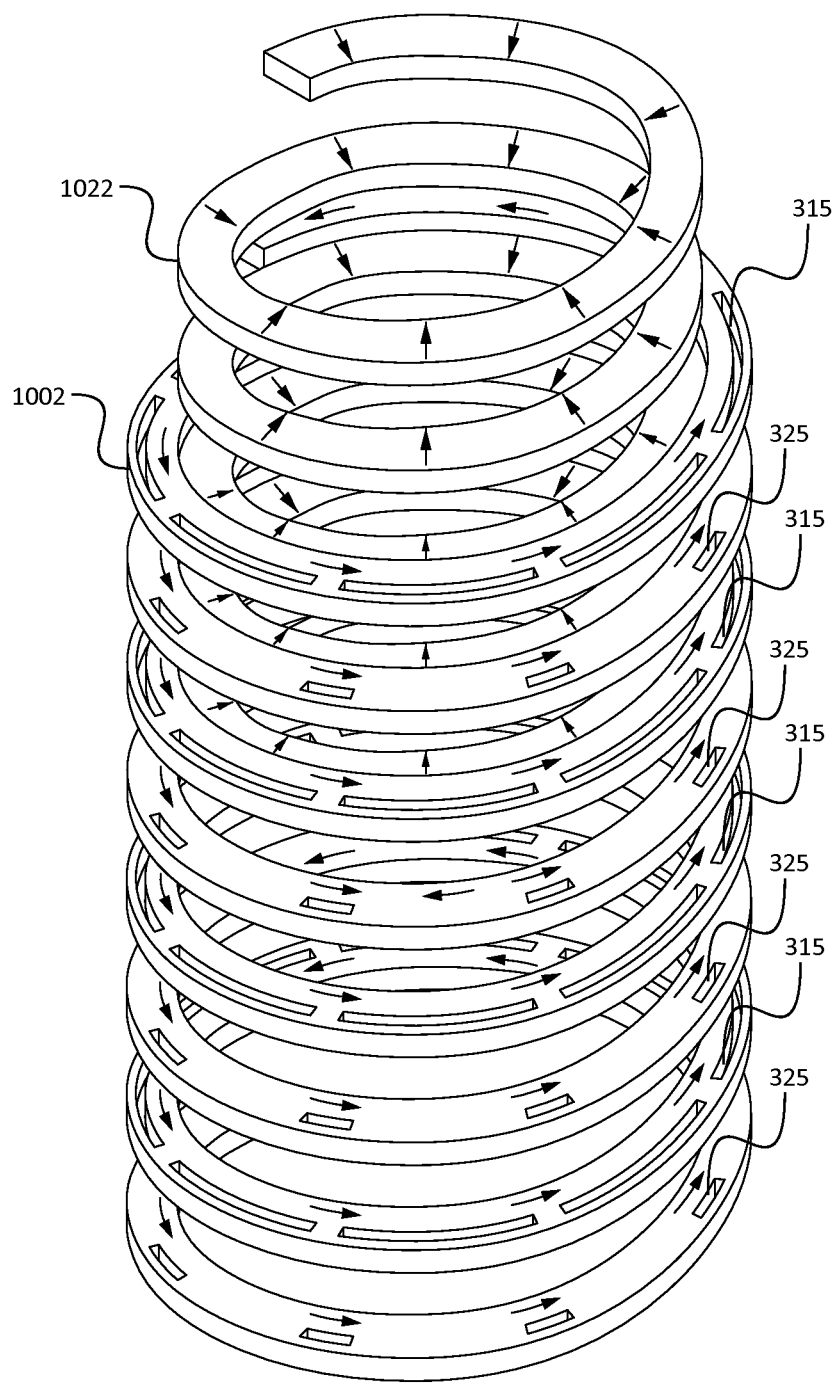
FIG. 7A is an exploded perspective view of two concentric wound strips, according to an embodiment of the present invention.
Figure 7B:
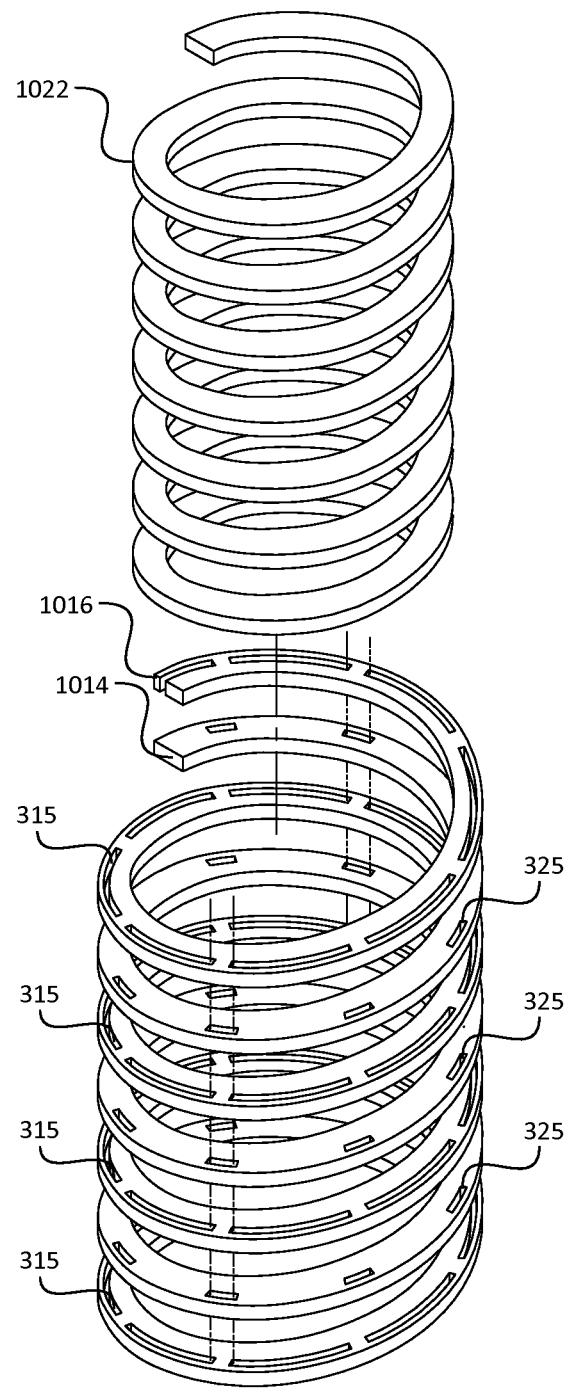
FIG. 7B is an exploded perspective view of two co-wound strips and a third wound strip concentric with the two co-wound strips, according to an embodiment of the present invention.

The use of non-isotropic or "anisotropic" materials such as grain-oriented materials in the structure of FIG. 7A may result in a significant reduction in magnetic losses compared with a conventional single part core. In one embodiment the strips are fabricated so that the grain vector is parallel to the strip length for the outer strip 1002 (back iron) and perpendicular to the strip length (i.e. parallel to the tooth direction, and to the width of the strip) for the inner strip 1022 (tooth element). With this approach, a general alignment between the magnetic and grain vectors may be achieved during operation, enabling a reduction of magnetic (core) losses. Furthermore, grain oriented material may have a higher permeability than non-oriented (isotropic) material, resulting in a reduction of magnetizing currents. These benefits may also be realized to some extent if grain-oriented material is only used for the back iron and conventional non-oriented material is used for the tooth iron. Referring to FIG. 7B, in another embodiment, a concentric wound strip structure is formed of a two co-wound strips 1014, 1016, having narrow apertures 325 and wide apertures 315 respectively, and a third strip that is concentric with the two co-wound strips. The third strip may have teeth (not shown in FIG. 7B) and the third strip may be inside the other two strips as shown in FIG. 7B (e.g., for use as a stator core in a motor with a rotor inside the stator).

In another embodiment, a structure with two concentric edge-wound strips is used for an inside-out radial gap stator. In this embodiment the outer strip may act as the tooth iron; it may have radially outward-facing teeth, facing the rotor, or it may have radially inward-facing teeth abutting against the inner (back-iron) strip. The outer strip may also have a grain vector parallel to the direction of the teeth. The inner strip may have fluid apertures 315, 325, and a grain vector parallel to the length direction of the strip; it may act as the back iron.

Figure 8:
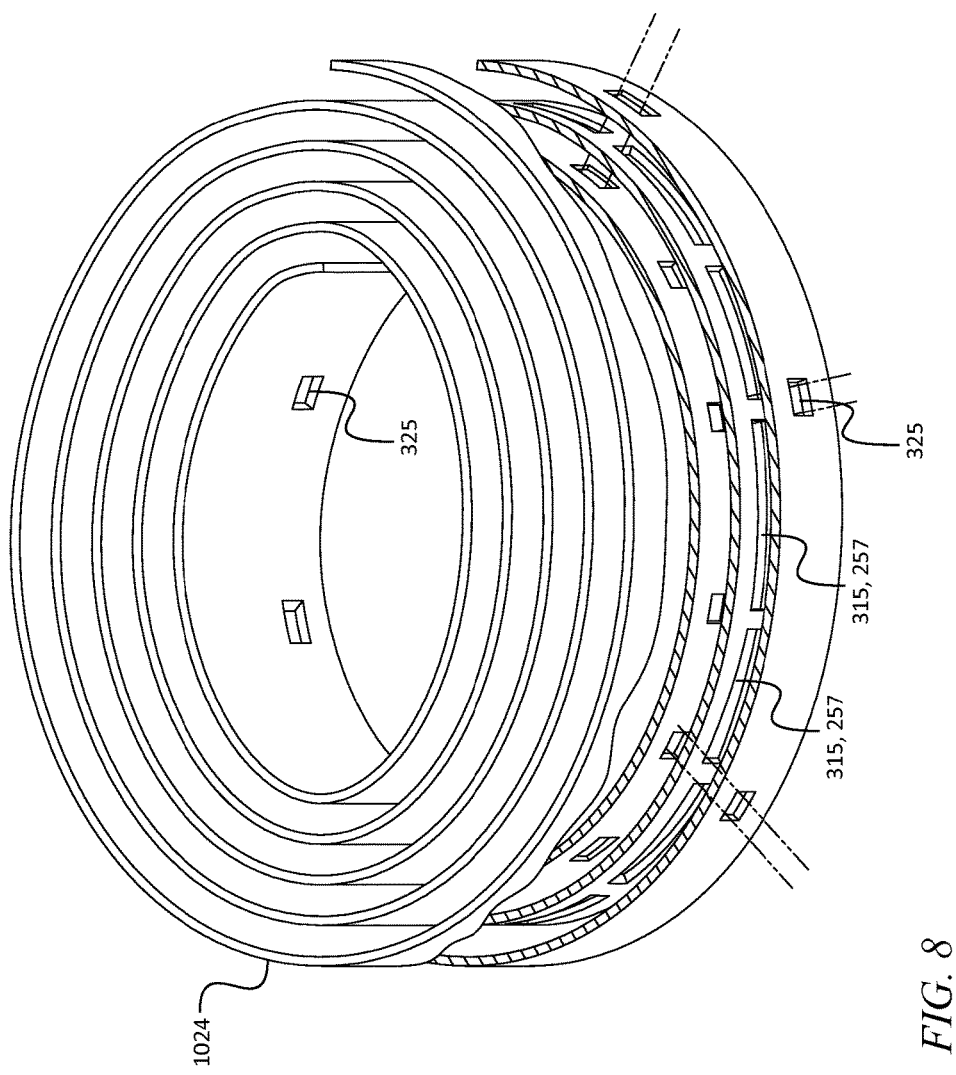
FIG. 8 is an exploded perspective view of a face-wound strip, according to an embodiment of the present invention.

Referring to FIG. 8, strip material with punched apertures may also be face-wound, forming a structure that has the shape of electrician's tape, being a strip with a length, a width, and a thickness, the length being greater than the width, and the width being greater than the thickness, the strip being wound into a spiral shape, with the curvature of the strip at every point being parallel to the thickness direction.

Figure 9:
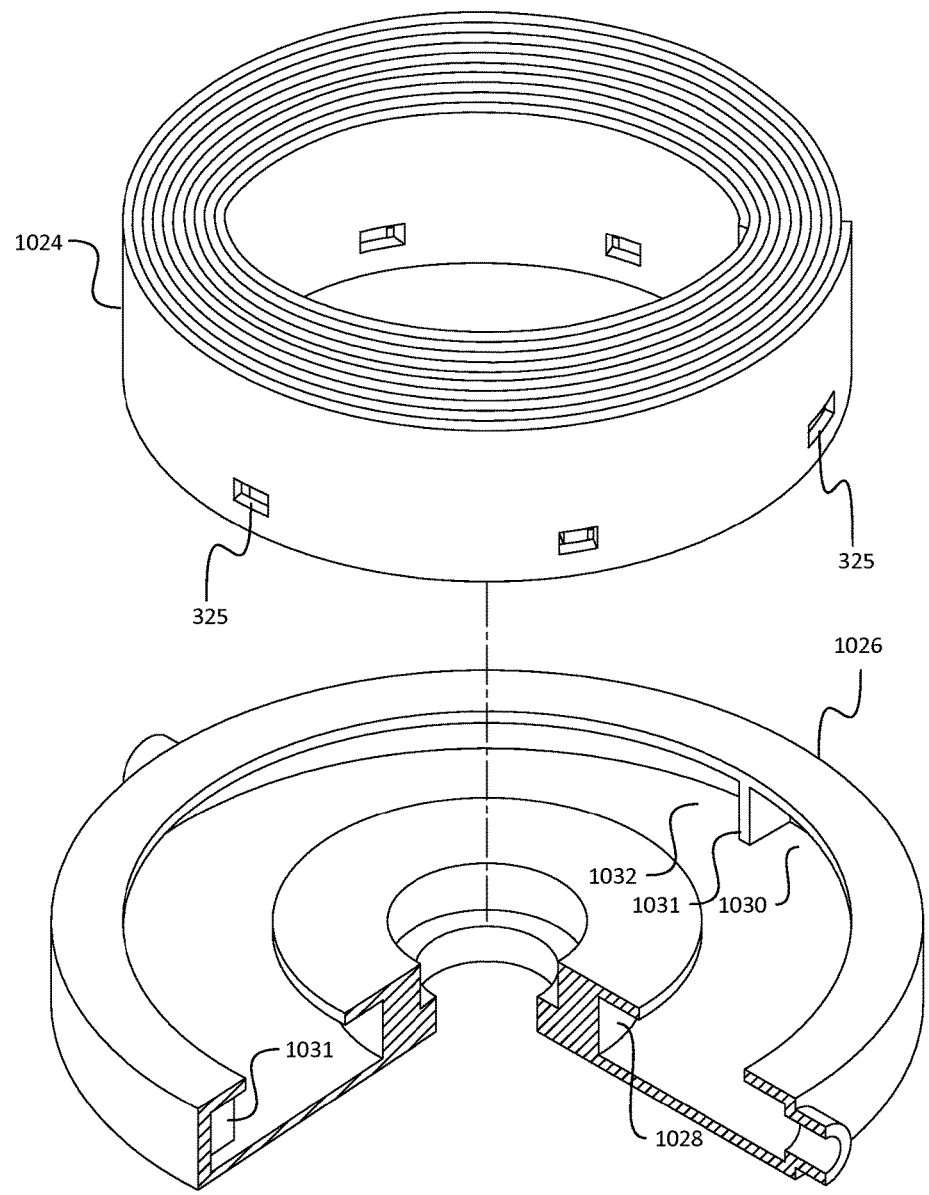
FIG. 9 is an exploded perspective view of a wound strip structure including the face-wound strip of FIG. 8, according to an embodiment of the present invention.
Figures 10A, 10B:
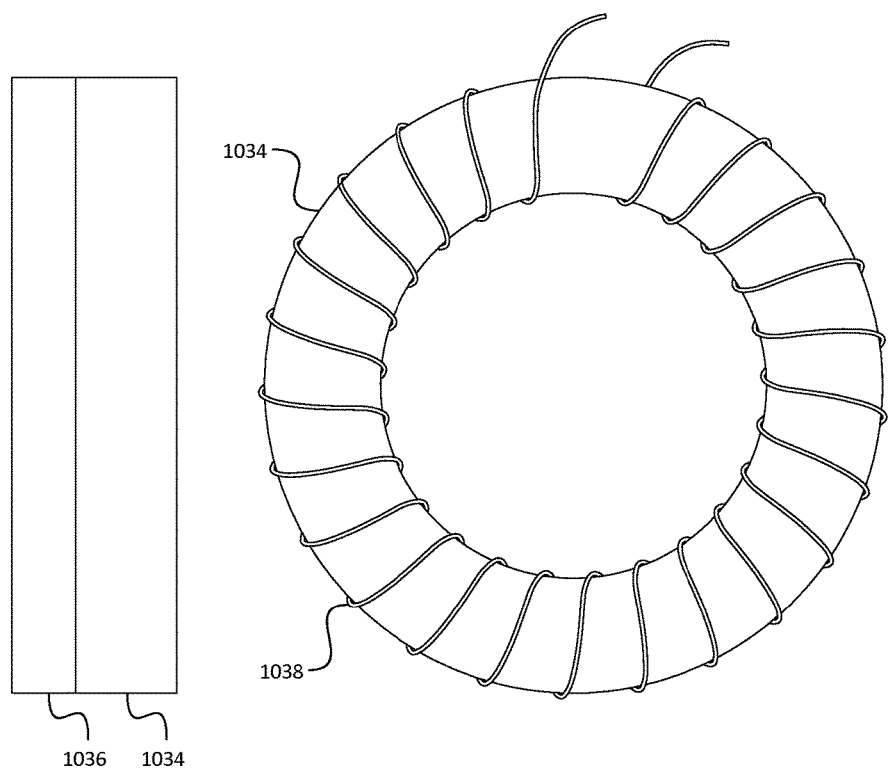
FIG. 10A is a side view of an inductor core formed as a wound strip structure, according to an embodiment of the present invention.
FIG. 10B is a plan view of an inductor constructed using the inductor core of FIG. 10A, according to an embodiment of the present invention.

In one embodiment, alternating turns of a single strip 1024 that is wound to form the wound strip include, alternately, sets of narrow fluid apertures 325 forming radial fluid passages and wide fluid apertures 315 forming transverse (azimuthal) fluid passages 257. Referring to FIG. 9, a manifold structure 1026 suitable for use with the wound strip of FIG. 8 may have an inner fluid channel 1028 and an outer fluid volume partitioned, by partitions 1031, into a first outer fluid channel 1030 and a second outer fluid channel 1032, which may act as inlet and outlet fluid channels respectively. Fluid may flow through the first outer fluid channel 1030, through the wound strip 1024 into the inner fluid channel 1028 and back out through the wound strip 1024 into the second outer fluid channel 1032. In one embodiment, two different wound strips are arranged concentrically, a face-wound strip being arranged concentrically inside an edge-wound strip, or an edge-wound strip being arranged concentrically inside a face-wound strip.

Maintaining turn-to-turn alignment of the apertures in a face-wound strip may be challenging, especially if large numbers of turns are involved or if the outside diameter (O.D.) is significantly larger than the inside diameter. Maintaining the alignment of the apertures of the outermost turn with those of the innermost turn may also be challenging. To address these challenges, a first manifold may be disposed coaxially at the I.D. of the wound strip, and a second manifold may be disposed coaxially at the strip O.D. The first and second manifolds may be inlet and outlet manifolds respectively, or vice versa. In another embodiment radial grooves are formed in a first face of the wound strip such that coolant pathways are established between these grooves and the apertures within the strip. A manifold disposed at the first face of the wound strip directs inlet coolant to a first set of radial grooves (e.g. odd numbered radial grooves), while receiving coolant flow from a second set of radial grooves (e.g., even numbered radial grooves). Such methods of supplying fluid to, and receiving fluid from, the axial passages 139 may suffice to establish coolant flow paths in which substantial flow components are parallel with the strip length, such that high performance heat transfer is achieved, even in the extreme case in which aperture alignment is random. In one embodiment, alternating turns of the face-wound strip in such a structure have wide fluid apertures 315, and the remaining turns have no apertures.

In one embodiment, the alignment of apertures in a wound strip may be maintained during fabrication by synchronizing a punching machine (e.g., a punch press) with a winding machine used to wind the strip (or strips). For example, an encoder on the winding machine may trigger the punching machine to punch apertures in the strip at specific angular positions of the winding machine. Radial grooves may also be formed in a face of the face-wound strip in this manner, i.e., by pre-punching the strip, instead of machining the grooves after the strip is wound.

Figures 11A, 11B:
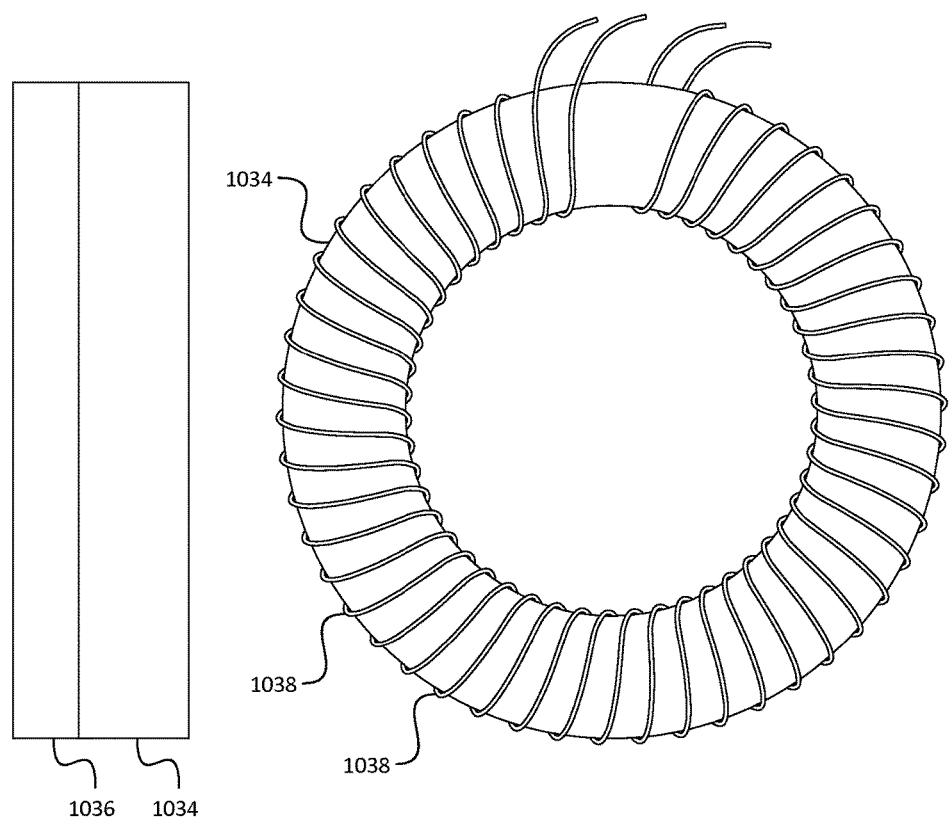
FIG. 11A is a side view of a transformer core formed as a wound strip structure, according to an embodiment of the present invention.
FIG. 11B is a plan view of a transformer constructed using the transformer core of FIG. 11A, according to an embodiment of the present invention.

Referring to FIGS. 10A-B and 11A-B, a toroidal core for a toroidal transformer or a toroidal inductor may be fabricated from a strip of magnetic material by winding the strip into a face-wound strip 1034 having fluid passages for efficient cooling, and providing a suitable manifold structure 1036 including inlet and outlet manifolds for supplying fluid to, and receiving fluid from, the passages. Appropriate windings 1038 may then be added to these cores to complete the desired magnetic component, e.g., an inductor (FIGS. 10A-B) or a transformer (FIGS. 11A-B). Heat produced within the winding is transferred to the core and then transferred to the cooling fluid, along with heat produced within the core material.

Figure 12B:
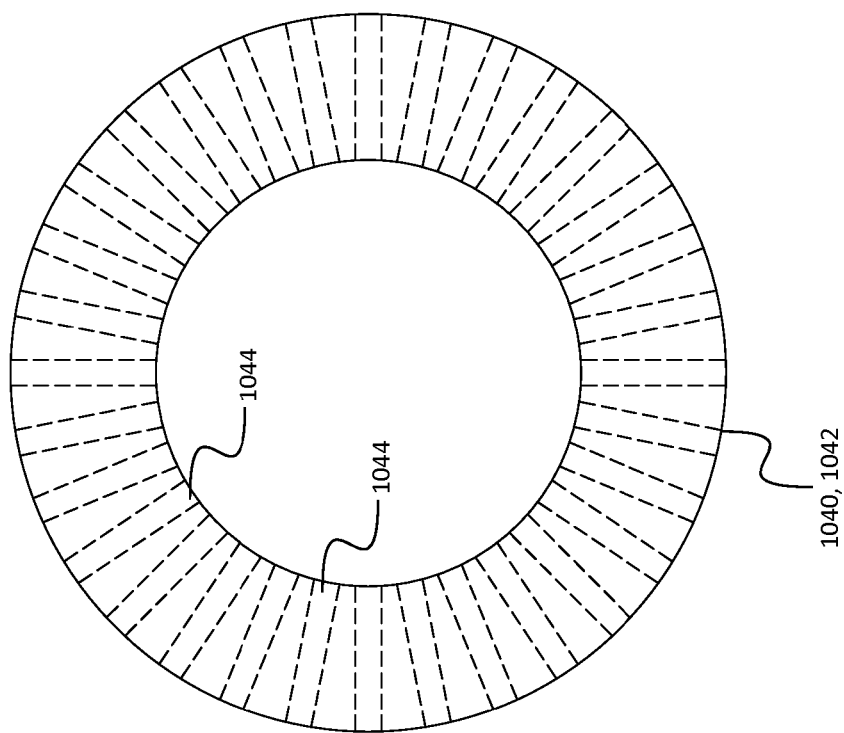
FIG. 12B is a front view of the stator core of FIG. 12A.
Figure 12A:
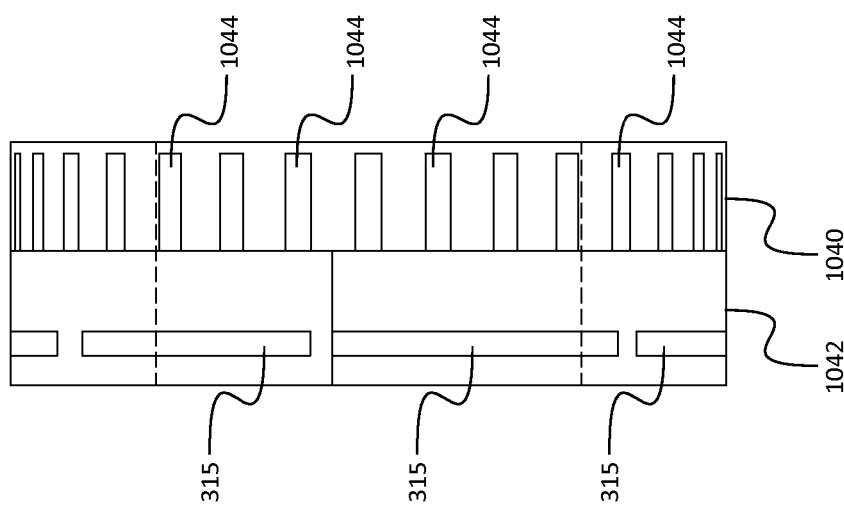
FIG. 12A is a side view of an electric machine stator core, according to an embodiment of the present invention.

Referring to FIGS. 12A and 12B, face-wound strips may also be used to form core elements, such as a stator, for an axial-gap electric machine. A first strip 1040 may form a tooth iron that performs the functions associated with the teeth, while a second wound strip 1042 may provide the back-iron function. The tooth iron may be formed by winding and bonding a blank strip (i.e., a strip without apertures). Fully open radial grooves 1044 may then be milled in one face of the winding to provide the winding slots. These slots may face away from the gap and toward the back iron, enabling easy application of the stator winding, while also serving to reduce tooth-tip losses. For the back iron element, apertures 315, 325 may first be formed in the strip material, and the second strip may then be face-wound and bonded to form a rigid element. Radial grooves may then be machined in the face closest to the apertures and a manifold may be added which directs coolant to and from the appropriate milled grooves. The two wound strips 1040, 1042 may then be bonded together to form the completed wound stator. Hidden lines corresponding to apertures in the second wound strip 1042 are omitted from FIGS. 12A and 12B for clarity. A rotor core may be constructed in an analogous fashion.

In this embodiment, grain-oriented material may be used for both strips 1040, 1042. For the tooth-iron strip 1040, the grain vector is parallel to the teeth, i.e., transverse to the length of the strip, and for the back-iron strip 1042, the grain vector is parallel with the strip length. By using grain oriented ferromagnetic materials in this manner, core losses and magnetizing currents may both be substantially reduced.

In another embodiment, a single strip performs the functions of both tooth iron and back iron. For example, a single ferromagnetic strip having apertures 315, 325 to form fluid passages may be face-wound and bonded to form a rigid core element. Under-cut radial grooves may then be machined in one face to provide winding slots. In one embodiment additional radial grooves may be machined in the face opposite the winding face such that coolant flow through the passages can be arranged, e.g., using the manifold structures described above. The rotor core of an axial-gap electric machine may be similarly fabricated.

Both edge-wound and face-wound strip structures may be used as heat transfer elements. An edge-wound strip may be used as a heat transfer sleeve in applications in which heat is being transferred to or from either the I.D. surface or the O.D. surface. For example, referring to FIGS. 13A-B, such a wound strip structure 1046 may be installed around the O.D. of an end turn 1048 of a radial gap electric motor, or inside the I.D. of the end turn (e.g., wound strip structure 1047 shown in phantom lines in FIG. 13A), or both, to provide cooling of the end turn. For simplicity, cross-hatching is omitted from FIG. 13A, and hidden lines are omitted from FIG. 13B.

Figure 14:
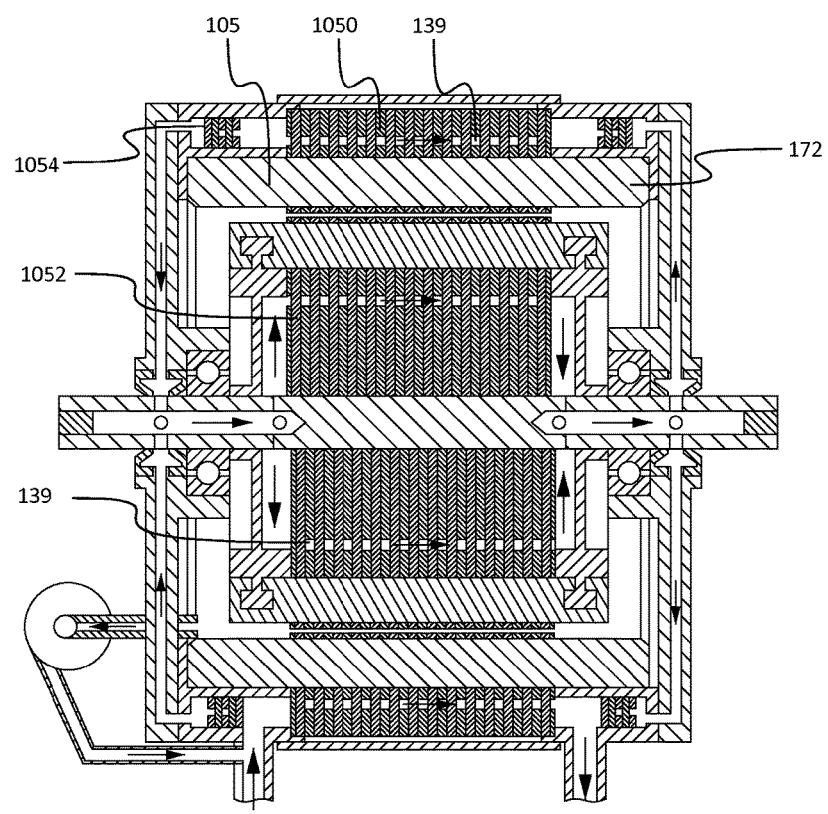
FIG. 14 is a cross section through an electric machine, according to an embodiment of the present invention.

Other elements of an electric machine may be used to provide cooling. For example referring to FIG. 14, an electric machine may include a stator with a stator core 1050, and a rotor with a rotor core 1052. Both the rotor core and the stator core may be wound strips, e.g., edge-wound strips, with apertures forming axial passages 139 and transverse passages. Additional wound strips 1054 may be employed to cool end turns 172 of a stator winding 105.

In general, an edge-wound or face-wound strip may have the shape of hollow cylinder with an outer cylindrical surface, an inner cylindrical surface, and two substantially flat end surfaces. The cylindrical surfaces may be used to exchange heat with (e.g., to cool) components (such as a stator end turn) with substantially cylindrical surfaces, and the end surfaces may be used to cool components with flat surfaces.

As used herein, a "heat transfer sleeve" is a hollow structure such as a hollow cylinder, having an interior surface and an exterior surface, such as the cylindrical interior and exterior surfaces of a hollow cylinder, one or both of the interior and exterior surfaces being configured as, or suitable for use as, a thermal interface. A heat transfer sleeve may also have two end surfaces, as may be the case for a hollow cylinder. A surface may be suitable for use as a thermal interface as a result of being sufficiently smooth to efficiently conduct heat to or from another component abutting against it. For example, the wound strip 1002 of the embodiment of FIG. 1 may have a smooth interior surface suitable for use as a thermal interface. A surface may also be suitable for use as a thermal interface if it is sufficiently smooth that it may be joined with a corresponding surface of another component using a suitable thermally conductive compound such as a thermally conductive resin, that may fill any minor voids between the two surfaces. The interior surface of a wound strip structure composed of two co-wound strips of different widths, such as those of the embodiment of FIG. 6, may be suitable for use as a thermal interface as a result of the interior surface of the wider strip 1015 being sufficiently smooth to transfer heat to another, abutting surface. In some embodiments a surface of a sealing sleeve (e.g., the exterior surface of sealing sleeve 1018 of FIG. 6) may be an interior or exterior surface suitable for heat transfer, and a wound strip structure including one or more wound strips and a sealing sleeve may be a heat transfer sleeve.

In one embodiment, an edge-wound strip having the shape of a hollow cylinder is made into a vessel, e.g., by sealing one or both faces of the wound strip with a plate. The vessel may then be used to cool its contents, e.g., liquid or solid materials placed into the vessel. In such an application, the edge-wound strip may be made of one or more conductive metal strips, e.g., copper or aluminum strips. In some embodiments, non-metallic strips are used to form a wound strip.

In some embodiments the strips used to form wound strips may have a thickness of between 0.2 mm and 0.3 mm. The wide fluid apertures 315 may have dimensions of about 19 mm×3 mm, and be separated by webs 312 having a width of about 3 mm. The narrow fluid apertures 325 may have dimensions of about 6.3 mm×3 mm.

Although exemplary embodiments of a fluid-cooled wound strip structure have been specifically described and illustrated herein, many modifications and variations will be apparent to those skilled in the art. Accordingly, it is to be understood that a fluid-cooled wound strip structure constructed according to principles of this invention may be embodied other than as specifically described herein. The invention is also defined in the following claims, and equivalents thereof.

What is claimed is:

1. A wound strip structure comprising one or more edge-wound or face-wound strips including a first strip, the one or more strips having a plurality of apertures, the first strip having a plurality of turns, an aperture of a turn of the first strip overlapping an aperture of an adjacent turn, to form a portion of a fluid channel, the turn and the adjacent turn abutting against each other at the overlapping apertures; and the first strip having a plurality of fluid channels, and further comprising a manifold having a manifold channel in fluid communication with the plurality of fluid channels.

2. The structure of claim 1, wherein:
the first strip has:
  a first aperture,
  a second aperture, and
  a third aperture,
having the same size and shape, and uniformly spaced along the first strip.

3. The structure of claim 1, wherein:
the first strip has a first aperture and a second aperture, the first aperture differing in shape and/or in size from the second aperture.

4. The structure of claim 1, wherein the one or more strips include a second strip co-wound with the first strip, the second strip having a plurality of turns,
wherein an aperture of a turn of the second strip overlaps an aperture of an adjacent turn of the first strip to define a portion of a fluid channel.

5. The structure of claim 4, wherein the first strip has an aperture differing in shape and/or in size from an aperture of the second strip.

6. The structure of claim 1, wherein at least one of the one or more strips:
is edge-wound; and
has a plurality of notches configured to facilitate winding.

7. The structure of claim 1, further comprising a flow director configured to direct fluid flow into, or receive fluid flow from, a subset of the plurality of fluid channels.

8. The structure of claim 7, wherein the flow director is a first turn of the first strip, wherein a turn adjacent to the first turn comprises an aperture not aligned with an aperture of the first turn.

9. The structure of claim 7, further comprising a manifold having a manifold channel in fluid communication with the plurality of fluid channels, wherein the flow director is secured to or integral with the manifold.

10. The structure of claim 1, further comprising a cylindrical sealing sleeve configured to seal an inner surface or an outer surface of the structure.

11. The structure of claim 1, wherein at least one of the one or more edge-wound or face-wound strips is composed of a non-isotropic material.

12. The structure of claim 1, comprising a second strip co-wound with the first strip, wherein
the first strip is composed of a non-isotropic material.

13. The structure of claim 1, wherein the first strip is composed of a ferromagnetic material.

14. The structure of claim 1, wherein the first strip is composed of a dielectric material.

15. The structure of claim 1,
wherein:
a first turn of the structure has a first inside diameter and a first outside diameter; and
a second turn of the structure has a second inside diameter and a second outside diameter; and
wherein:
the second inside diameter is different from the first inside diameter and/or
the second outside diameter is different from the first outside diameter.

16. The structure of claim 15, wherein the one or more strips include:
a second strip co-wound with the first strip, and
a third strip concentric with the first strip and the second strip,
the first strip, the second strip, and the third strip being coupled by thermal coupling, mechanical coupling, magnetic coupling, electrical coupling, or combinations thereof.

17. The structure of claim 1, wherein the one or more strips include a second strip concentric with the first strip, the first strip and the second strip being coupled by thermal coupling, mechanical coupling, magnetic coupling, electrical coupling, or combinations thereof.

18. The structure of claim 17, wherein:
the first strip is composed of a non-isotropic material having a circumferential defining property vector; and
the second strip is composed of a non-isotropic material having a radial defining property vector.

19. The structure of claim 1, wherein the one or more strips include a second strip adjacent, and coaxial with, the first strip, the first strip and the second strip being coupled by thermal coupling, mechanical coupling, magnetic coupling, electrical coupling, or combinations thereof.

20. The structure of claim 1, having a fissure between adjacent turns, and further comprising a sealant configured to prevent fluid from escaping from a fluid channel through the fissure.

21. The structure of claim 1, configured to form part of an electric machine stator or rotor core.

22. The structure of claim 1, configured to form part of an inductor core.

23. The structure of claim 1, configured to form part of a transformer core.

24. The structure of claim 1, configured to form part of a heat transfer sleeve and having an interior surface configured as a thermal interface.

25. The structure of claim 24, further comprising a plate, wherein:
the heat transfer sleeve has the shape of a hollow cylinder, and
the plate is secured to one end of the hollow cylinder to form a vessel.

26. The structure of claim 1, configured to form part of a heat transfer sleeve and having an exterior surface configured as a thermal interface and/or having an end surface configured as a thermal interface.

27. The structure of claim 26, further comprising an electric machine stator, wherein the exterior surface or the end surface of the heat transfer sleeve is thermally coupled to an end turn of the stator.

28. A wound strip structure comprising a strip having a plurality of apertures, the strip being edge-wound or face-wound and having a plurality of turns including two end turns and a plurality of interior turns,
wherein:
each of a first plurality of interior turns comprises a plurality of first apertures each having a first length in the direction of the strip;
each of a second plurality of interior turns, alternating with the turns of the first plurality of interior turns, comprises a plurality of second apertures, each having a second length, shorter than the first length, in the direction of the strip;
an interior turn of the first plurality of interior turns abuts against an interior turn of the second plurality of interior turns at one of the first apertures of the interior turn;
each of the plurality of second apertures overlaps two first apertures, adjacent to each other, of an adjacent turn; and
each of the end turns is configured to direct fluid flow into, or receive fluid flow from, a subset of the apertures of an adjacent interior turn.

29. A wound strip structure having the shape of a hollow cylinder having an interior surface, an exterior surface, a first end surface and a second end surface, and comprising:
one or more strips comprising a first strip having:
two face surfaces;
a first edge surface; and
a second edge surface,
the first strip being wound with a plurality of turns:
in a helix, the first edge surface forming the interior surface of the cylinder, and the second edge surface forming the exterior surface of the cylinder, or
in a spiral, the first edge surface forming the first end surface of the cylinder, and the second edge surface forming the second end surface of the cylinder,
each turn of the first strip having a plurality of apertures, each aperture overlapping two apertures of an adjacent turn, a turn of the first strip and an adjacent turn abutting against each other at the apertures of the turn of the first strip; and the first strip having a plurality of fluid channels, and further comprising a manifold having a manifold channel in fluid communication with the plurality of fluid channels.

* * * * *